Oct. 5, 1926.
R. P. BLODGETT
PERCOLATOR
Filed May 19, 1925
1,601,901
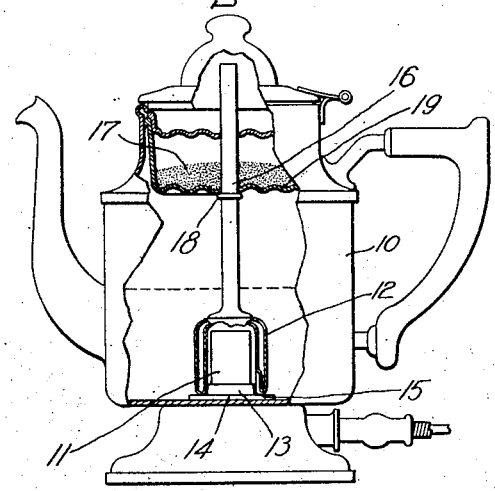
Fig. 1.
Fig. 4. Fig. 5.
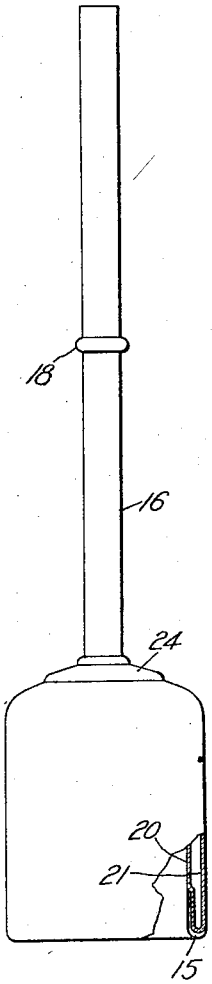
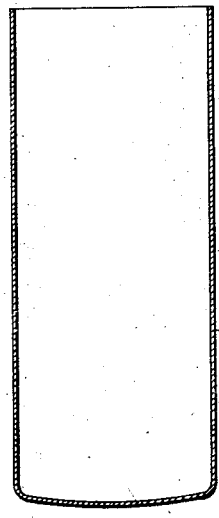
Fig. 2.
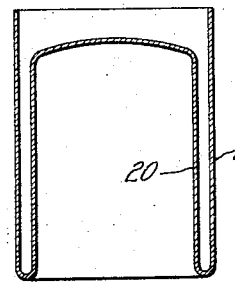
Fig. 3.
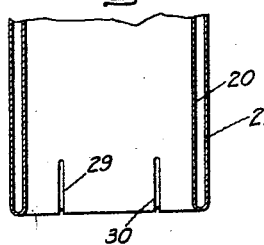
Fig. 6.
Inventor:
Ross P. Blodgett,
by
His Attorney.

Patented Oct. 5, 1926.

1,601,901

UNITED STATES PATENT OFFICE.

ROSS P. BLODGETT, OF CHICAGO, ILLINOIS, ASSIGNOR TO EDISON ELECTRIC APPLIANCE COMPANY, INCORPORATED, OF CHICAGO, ILLINOIS, A CORPORATION OF NEW YORK.

PERCOLATOR.

Application filed May 19, 1925. Serial No. 31,394.

My invention relates to percolators such, for example, as used in the making of coffee, and has for its object the provision of an improved pump for percolators.

For a more complete understanding of my invention reference should be had to the accompanying drawing in which Fig. 1 is a view partly in section showing an electric percolator embodying my invention; Figs. 2, 3, 4 and 5 are views showing the various steps in the manufacture of the pump; while Fig. 6 is a fragmentary sectional view showing a modified form of my invention.

Referring to the drawing, I have shown my invention as applied to a conventional form of electric coffee percolator comprising a receptacle 10 for the prepared coffee beverage which is provided at the bottom with a centrally located cylindrical electric heater 11. This heater extends upward into the receptacle 10, and the tubular pump 12 is set over it. Around the base of the heater 11 is a spacing ring 13 which forms a fairly close fit with the bore of the pump whereby the lower end of the pump is closed and the pump is held concentric with the heater. Preferably the spacing ring 13 is tapered somewhat to take up small manufacturing variation in the diameter of the pump. The heater is thus surrounded with a wall of water of substantially uniform thickness. The pump 12 rests on the bottom of the receptacle or, as shown, it may rest on a clamping flange 14, forming a part of the heater 11. Water from the receptacle 10 enters through one or more grooves 15 in the lower edge of the pump and is forced upward by steam pressure, in a well known manner, through a tube 16, the hot water falling on the ground coffee 17 and percolating through it into the coffee beverage receptacle 10. As shown, the tube 16 is provided with a flange 18 which forms a support for the ground coffee container 19.

My invention relates more specifically to the features of construction of the pump 12. The relatively large lower tubular portion of the pump is formed with spaced double walls 20 and 21 (Fig. 4) which are joined together at the lower end by a bend or fold 22. It is formed from a single piece of sheet metal and may conveniently be formed from a cylindrical cup 23, as shown in Fig. 2. The first operation is to draw the bottom or closed end of the cup upward inside the cylindrical portion as indicated in Fig. 3, and then the groove 15 is formed. These operations may be carried out by means of suitable stamping dies. The next operation is to spin the upper ends of the walls 20 and 21 into the desired convex shape, a central aperture being formed in the top of the inner wall 20. During the forming of the upper ends of the walls, the inner wall 20 is forced outward through the outer wall and curled back over the edge of the outer wall as indicated by the reference numeral 24. This leaves a smooth central aperture 25 at the top.

Registering rings 26 are extruded in both walls near their upper ends around the central aperture. These extruded rings are provided for the purpose of giving the walls a permanent set and thus hold them securely in place while a welded joint 27 is formed between the curled end 24 of the inner wall and the outer wall. Furthermore, the extruded rings confine the weld to the circular area between them and the curled portion 24. As indicated in the drawing, this area is filled with metal by the welding operation. The surface of the metal of the weld is then machined smooth to present a neat appearance when finished. The tube 16 is inserted in the aperture 25 until a shoulder 28 formed on it engages the outer edge of the aperture and its inner end is then expanded or spun outward against the inner wall 20 as indicated in the drawing to secure the tube in place. Preferably the pump is made of aluminum throughout.

The groove 15 extends across the lower edge of the pump, and also extends upward in the inner wall 20 for a distance somewhat greater than the height of the spacing ring 14. This permits the liquid to flow from the vessel 10 through the groove into tthe space around the heater 11. The size of the groove should be such that the pump will start operating, the water being cold, in from three to five minutes after the current is turned on and then continue pumping at a sufficient rate to circulate the entire amount of water by the time the water in the receptacle reaches boiling temperature. If the groove were made smaller, the pumping action would start at once but a smaller quantity of water would be pumped, while if the groove were larger a relatively great amount of water would be driven back through the groove to warm the water in the receptacle. The double walls 20 and 21 provide a heat insulating air space between the hot water in the pump and the cold water surrounding the pump.

In the modified form shown in Fig. 6 a plurality of grooves are used, two grooves 29 and 30 being shown, the sizes of these grooves being suitably selected to give the desired pumping action. This construction prevents the complete stoppage of the pump by the filling of a groove, for example, by coffee grounds spilled in the receptacle 10, which would occur if only one groove was used.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is,—

1. A percolator pump comprising a double walled tubular member formed from sheet material, the lower edge of said member consisting of a fold in said material, said walls being provided with a groove extending across the lower edge of said member.

2. A percolator pump comprising a tubular member formed from sheet material, said member being provided with spaced double walls joined at one end by a fold in said material, said walls being formed with a groove extending across the lower edge of said member and upward in the inner wall.

3. A percolator pump comprising a double walled tubular member formed from a single piece of sheet metal, the lower edge of said member consisting of a fold in said metal, said walls being shaped at the top to form a central aperture, a welded joint between said walls at said aperture, and a tube secured in said aperture, said walls being formed with a groove extending across the lower edge of said member.

4. A percolator pump comprising a double walled tubular member formed from a single piece of sheet metal, the lower edge of said member consisting of a fold in said metal, said walls being shaped at the top to form a central aperture, and said inner wall extending through said aperture and being bent over the end of said outer wall.

5. A percolator pump comprising a double walled tubular member formed from a single piece of sheet metal, the lower edge of said member consisting of a fold in said metal, said walls being shaped at the top to form a central aperture, and said inner wall being forced through said aperture and curled over the end of said outer wall, extruded rings in said walls around said aperture, and a mass of metal forming a welded joint between said walls filling the space between the curled end of said inner wall and the extruded ring on said outer wall.

6. A percolator pump comprising a double walled tubular member formed from a single piece of sheet metal, the lower edge of said member consisting of a fold in said metal, said walls being shaped at the top to form a central aperture and said inner wall extending through said aperture and being bent over the end of said outer wall, a welded joint between the ends of said walls around said aperture, and a tube secured in said aperture, said walls being formed with a groove extending across the lower edge of said member and upward in said inner wall.

7. A percolator pump comprising a double walled tubular member formed from a single piece of sheet metal, the lower edge of said member consisting of a fold in said metal, said walls being provided with a plurality of grooves forming inlet openings extending across the lower edge of said member.

8. A percolator pump arranged to be set over a spacing member, said pump being provided with a groove forming an inlet opening extending across its lower edge and upward in its inner wall to a point above said spacing member.

9. A pump for electric percolators provided with an electric heater having a lower spacing member, comprising a member enclosing said heater and fitting over said spacing member, said member being provided with a groove forming an inlet opening extending across its lower edge and upward in its inner wall to a point above said spacing member.

In witness whereof I have hereunto set my hand this 15th day of May, 1925.

ROSS P. BLODGETT.